United States Patent [19]
Song et al.

[11] Patent Number: 6,150,048
[45] Date of Patent: Nov. 21, 2000

[54] METALLIC INTERCONNECTION MATERIAL FOR SOLID OXIDE FUEL CELL AND METHOD FOR PREPARING THE SAME

[75] Inventors: Rak-Hyun Song; Dong-Ryul Shin, both of Taejon; Kwangg-Sun Jeon, Kyunggi; Yi-Sup Han, Taejon, all of Rep. of Korea; Dokiya Masayuki, Kanagawa, Japan

[73] Assignee: Korea Institute of Energy Research, Seoul, Rep. of Korea

[21] Appl. No.: 09/364,168

[22] Filed: Jul. 30, 1999

[30] Foreign Application Priority Data

Aug. 3, 1998 [KR] Rep. of Korea .............. 98-31581

[51] Int. Cl.[7] ................................... H01M 8/10
[52] U.S. Cl. ...................... 429/33; 429/34; 429/36; 429/123; 429/129; 429/152; 429/158; 429/160; 429/161; 429/210; 419/2; 419/10; 419/19; 419/20; 419/63; 419/64; 419/65; 420/416; 420/428; 75/232; 75/233; 75/234; 427/115
[58] Field of Search .................. 429/33, 34, 36, 429/123, 129, 152, 158, 160, 161, 210; 419/2, 10, 19, 20, 63, 64, 65; 420/416, 428; 75/232, 233, 234; 427/115

[56] References Cited

U.S. PATENT DOCUMENTS

| | | | |
|---|---|---|---|
| 5,132,352 | 7/1992 | Richards et al. | 427/115 |
| 5,389,456 | 2/1995 | Singh et al. | 427/115 |
| 5,391,440 | 2/1995 | Kuo et al. | 429/34 |
| 5,407,758 | 4/1995 | Grenier et al. | 429/33 |
| 5,942,349 | 8/1999 | Badwal et al. | 429/34 |

*Primary Examiner*—Bruce F. Bell
*Attorney, Agent, or Firm*—DeLio & Peterson, LLC

[57] ABSTRACT

Disclosed are a metallic interconnection material for solid oxide fuel cells and a preparation method thereof. The metallic interconnection material has two fine microstructural phases in which 5–25% by volume of $LaCrO_3$ is dispersed at the grain boundaries of Cr particles. It can be prepared by mixing 75–95% by volume of a Cr powder and 5–25% by volume of an $LaCrO_3$ powder, together with a solvent and a binder, in a mill, molding the mixture into a predetermined shape after drying, and sintering the molded shape at approximately 1,500° C. for 10 hours in an Ar atmosphere with 5 vol % of hydrogen to give an $LaCrO_3$-dispersed Cr alloy. The $LaCrO_3$-dispersed Cr alloy shows high electric conductivity by virtue of the growth inhibition of Cr particles during sintering and high chemical stability by virtue of the presence of the rare earth metal, La, meeting meet the requirements for the interconnection materials for solid oxide fuel cells.

4 Claims, 6 Drawing Sheets

METALLIC INTERCONNECTION MATERIAL FOR SOLID OXIDE FUEL CELL AND METHOD FOR PREPARING THE SAME

BACKGROUND OF THE INVENTION

1. Field of the Invention

The present invention relates, in general, to a metallic interconnection material for solid oxide fuel cells which are operable at relatively high temperatures and, more particularly, to a metallic interconnection material for solid oxide fuel cells, which is superb in electric conductivity and oxidation resistance. Also, the present invention is concerned with a method for preparing such a metallic interconnection material.

2. Description of the Prior Art

In fuel cells, the interconnection material (ICM) has two important functions of electrically connecting one cell to another cell in a cell stack and separating feed gases so as not to mix them in a cell. In relation to this, the interconnection material is also termed "bipolar plate" or "separator".

To play a perfect role in the electric connection and the gas separation, the interconnection material is required to be chemically stable in oxidation and reduction environments and structurally dense enough to be gas-tight as well as show high electrical conductivity to allow electrons to continuously flow.

In particular, since solid oxide fuel cells are operated at a high temperature of 600–1,000° C., their interconnection materials must be of chemical stability at such a high temperature and of thermal interchangeability with other components of cells in a range from room temperature to the operation temperature of the cells. Additionally, the requirements for the interconnection material include high mechanical strength, matching in thermal expansion with other cell components (especially, solid ceramic electrolytes) and low ion conductivity.

There have conventionally been used two kinds of interconnection materials: ceramic and metallic.

Representative of ceramic interconnection materials are $LaCrO_3$-based interconnection materials with a perovskite structure. The ceramic materials suffer from a disadvantage in that the reduction of $Cr^{+4}$ into $Cr^{+3}$ in a reducing atmosphere increases the ion radius, resulting in a volume expansion of the materials. In detail, since the opposite sides of a bipolar plate made of an $LaCrO_3$-based ceramic material are respectively operated under different oxygen partial pressures in a fuel cell, either a volume expansion takes place only on one side of the bipolar plate to bend the plate. Even if the plate is not bent by virtue of the load of the stack itself, the stress created within the material becomes larger than the breaking strength of the material, resulting in a breakage of the stack. Other disadvantages of the ceramic interconnection materials are that they are low in thermal conductivity, mechanical strength and electric conductivity and difficult to process and prepare.

Metallic interconnection materials, developed as a result of extensive efforts to solve the problems encountered in the ceramic interconnection materials, are superior in electrical conductivity, processability, thermal conductivity and mechanical strength to the ceramic interconnection materials, but disadvantageous in that they are high in coefficient of thermal expansion with vulnerability to oxidation. The metallic interconnection materials developed thus far are exemplified by $Al_2O_3$/Inconnel 600 cermet [see, H. Seto, T. Miyata, A. Tsunoda, T. Yoshida and S. Sakurada, Proceedings of the third International Symposium on Solid Oxide Fuel Cells, S. C. Singhal and H. Iwahara (eds.), The Electrochemical Society, Inc., NJ 08534-2896 p.421 (1993)], $(LaSr)CoO_3$ coated with Ni—20Cr, and $Y_2O_3$- or $La_2O_3$-dispersed Cr alloys (see, U.S. Pat. No. 5,407,758).

Of the conventional metallic interconnection materials, Ni alloys are large in the coefficient of thermal expansion and show poor oxidation resistance at such a high temperature as is necessary for the operation of the fuel cells. As for Cr alloys, they have an advantage over the Ni alloys in the coefficient of thermal expansion, but the oxide layers formed on them disadvantageously are of high volatility at high temperatures. Furthermore, the $Al_2O_3$, $Y_2O_3$ or $La_2O_3$ added in the metal alloys is lacking in electric conductivity, giving rise to a great increase in the electric resistance of the oxide layers formed upon oxidation. The volatilization and electric conductivity reduction of the Cr oxide layers increases the internal resistance of the fuel cells and the polarization resistance of air poles, resulting in a significant decrease in the life span of the fuel cells.

Another metallic interconnection material is found in U.S. Pat. No. 5,407,758 which discloses a ducrolloy comprising a small quantity of iron and rare earth metals, identified as $Cr5Fe1Y_2O_3$. This ducrolloy has a coefficient of thermal expansion similar to those of ceramic solid electrolytes and is excellent in electric conductivity compared with conventional interconnection materials while showing low surface oxidation even after use for a long period of time by virtue of the presence of $Y_2O_3$. With these advantages, a great interest has been taken in the ducrolloy as an interconnection material for high temperature type fuel cells. However, there remains a need for an improvement for this chrome-based alloy material as it suffers from disadvantages in that the volatilization of chrome makes the air pole poor in performance and the Cr oxide scale formed on the metal surface has so low electric conductivity that an increase is brought about in the contact resistance between the air pole and the interconnection material.

SUMMARY OF THE INVENTION

Therefore, it is an object of the present invention to overcome the above problems indicated in conventional interconnection materials for solid oxide fuel cells and to provide a metallic interconnection material for solid oxide fuel cells, which has a fine microstructure and shows high electric conductivity and chemical stability.

It is another object of the present invention to provide a method for preparing such a metallic interconnection material.

In accordance with an aspect of the present invention, there is provided a metallic interconnection material for solid oxide fuel cells, composed of two fine microstructural phases in which 5–25% by volume of $LaCrO_3$ are dispersed at the grain boundaries of Cr particles.

In accordance with an aspect of the present invention, there is provided a method for preparing a metallic interconnection material for solid oxide fuel cells, comprising the steps of: mixing 75–95% by volume of a Cr powder and 5–25% by volume of an $LaCrO_3$ powder, together with a solvent and a binder, in a mill; molding the mixture into a predetermined shape after drying; and sintering the molded shape at approximately 1,500° C. for 10 hours to give an $LaCrO_3$-dispersed Cr alloy.

BRIEF DESCRIPTION OF THE DRAWINGS

The above and other objects and aspects of the invention will become apparent from the following description of embodiments with reference to the accompanying drawings in which.

DETAILED DESCRIPTION OF THE INVENTION

Knowledge of the sintering and oxidation behaviors of $LaCrO_3$-dispersed Cr alloys allows the determining of the content of $LaCrO_3$ in the alloys, which enables the alloys to be useful for metallic interconnectors of solid oxide fuel cells, leading to the invention.

In accordance with the present invention, the content of $LaCrO_3$ in the Cr alloy ranges from 5 to 25 vol %. The interconnection material is obtained by sufficiently mixing a Cr powder and a $LaCrO_3$ powder, together with a solvent and a binder, in a ball mill and subjecting the mixture to drying, pulverizing, molding and sintering processes. The reason why a selection is made on $LaCrO_3$ and the content of $LaCrO_3$ in the Cr-based alloy is confined in the range is as follows.

$LaCrO_3$, having a perovskite structure, keeps a constant coefficient of thermal expansion at $9.3 \times 10^{-6}$ m/m.k over a temperature range from room temperature up to 1,000° C. and has an electron conductivity of around 1 $\Omega^{-1}cm^{-1}$, showing the characteristic of being greatly increased in electric conductivity by the addition of a doping element. In addition, its evaporation pressure which is lower than that of other chrome oxides is helpful in restraining the volatilization of the interconnection material.

The $LaCrO_3$-dispersed Cr alloys of the present invention have a microstructure in which small $LaCrO_3$ particles exist in a dispersed state at the grain boundaries of large Cr particles. The presence of $LaCrO_3$ particles at the Cr grain boundaries prevents the moving of the grain boundaries and the rearrangement of crystals upon the Cr particle growth which occurs during a sintering process, leading to a Cr alloy sintered body with a fine microstructure.

Generally, the oxide formed on pure Cr in an oxidizing atmosphere is poor in fineness and bonds weakly to its base material, Cr, as compared with those on the surface of Cr alloys. When being alloyed with a rare earth metal, such as Y, La or Zr, the Cr alloys are revealed to have an oxide grown at a significantly slow rate thereon, which indicates that the Cr alloys are more resistant to oxidation than is pure Cr.

Based on this fact discovered by the present inventors, the present invention utilizes $LaCrO_3$ to improve the oxidation resistance of the Cr alloys. The content of $LaCrO_3$ in the alloys is preferably on the order of approximately 5 to 25% by volume and more preferably approximately 10 to 20% by volume in terms of oxidation resistance. For instance, with less than 5% by volume of the $LaCrO_3$, the addition effect is not conducted. On the other hand, more than 25% by volume of the $LaCrO_3$ makes the grain boundary structure in the Cr oxide so altered as to lower the oxidation resistance.

Figure 1:
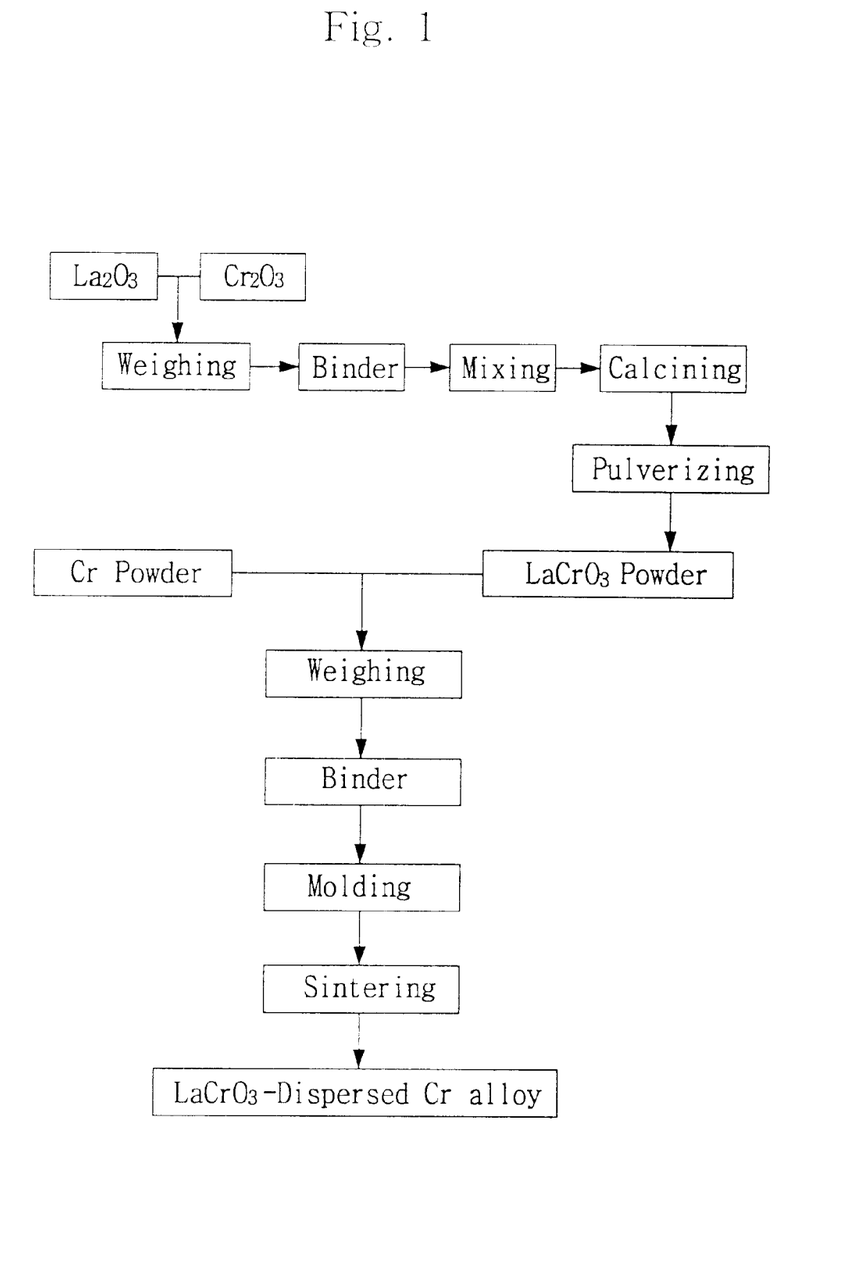
FIG. 1 is a process flow for preparing a metallic interconnection material for solid oxide fuel cells, according to the present invention.
Figure 2A:
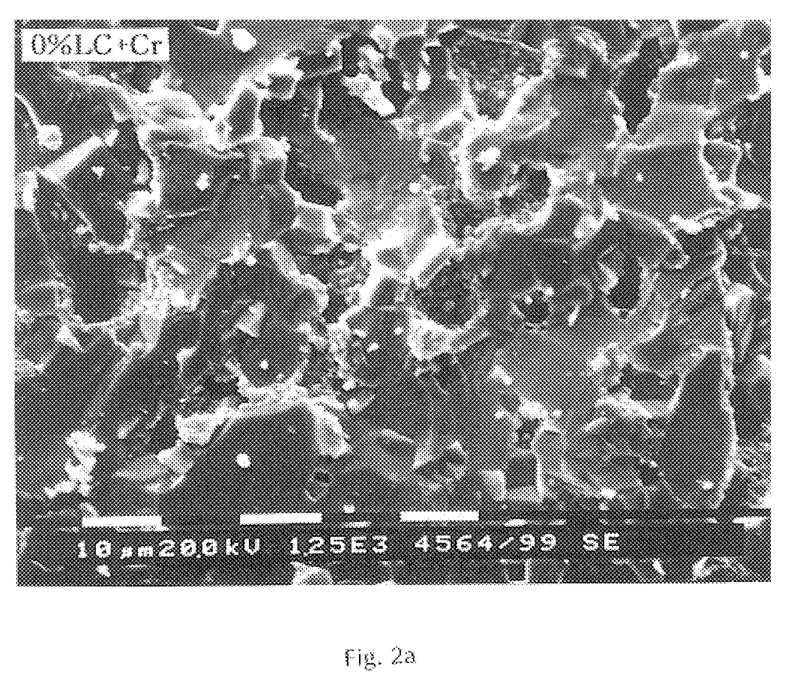
FIGS. 2a to 2f are scanning electron microphotographs showing the microstructures of the $LaCrO_3$-dispersed Cr alloys as a function of $LaCrO_3$ content.
Figure 2B:
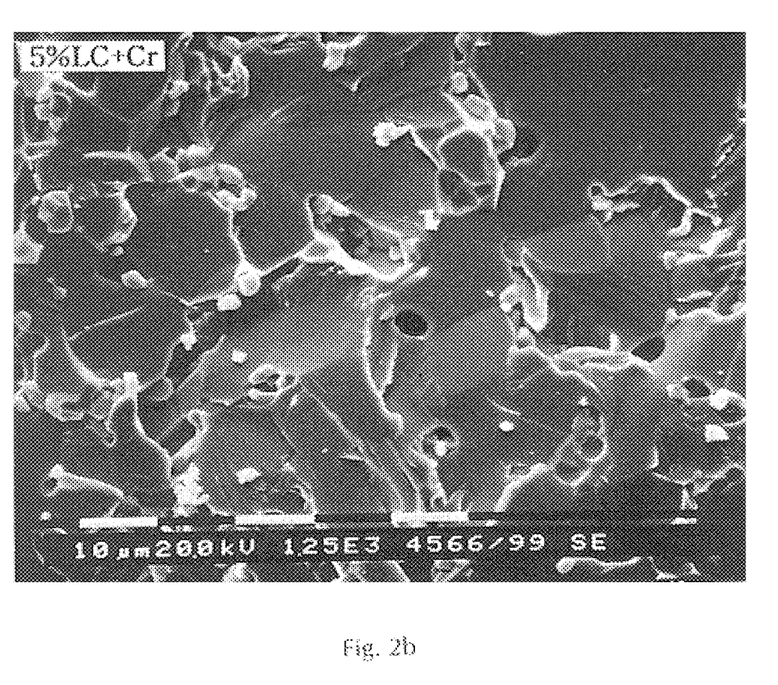
Figure 2C:
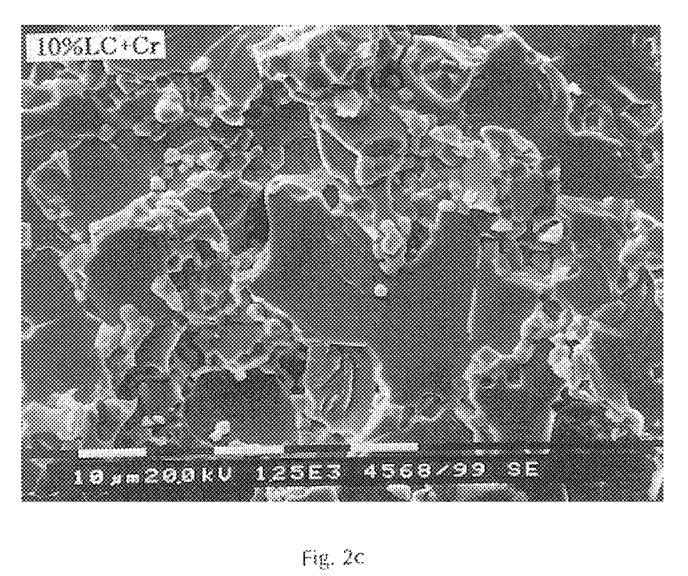
Figure 2D:
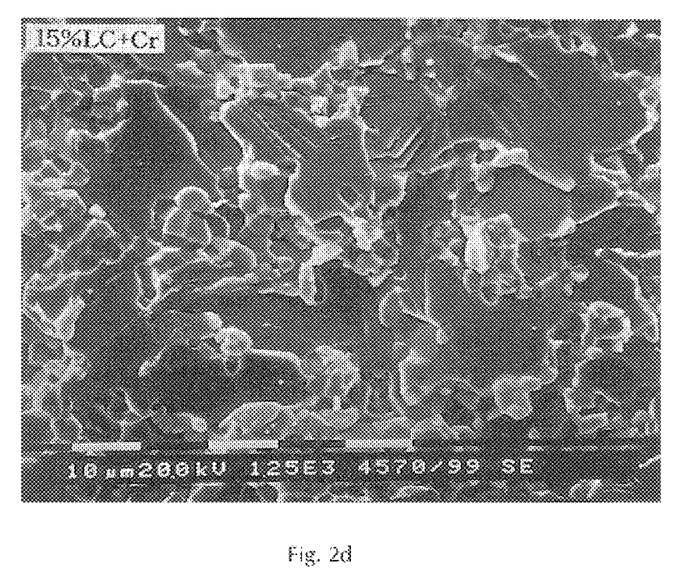
Figure 2E:
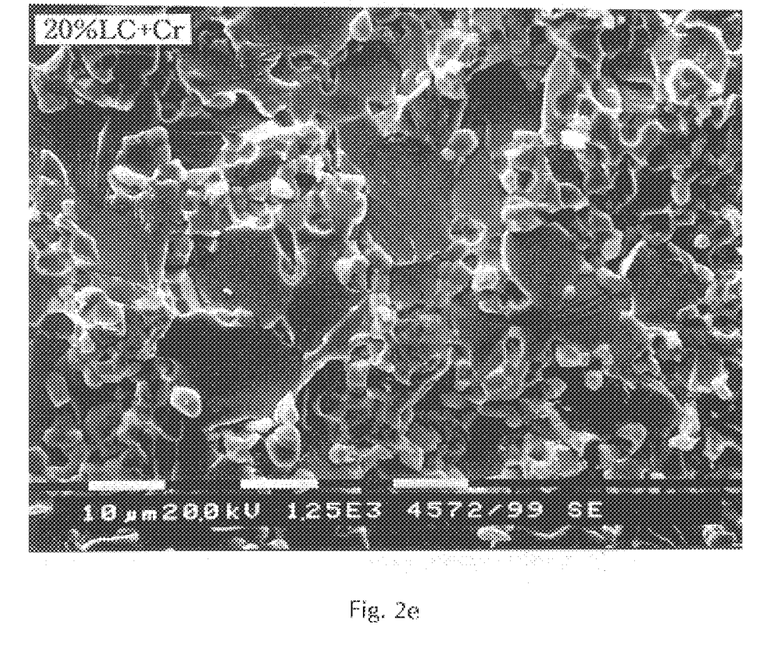
Figure 2F:
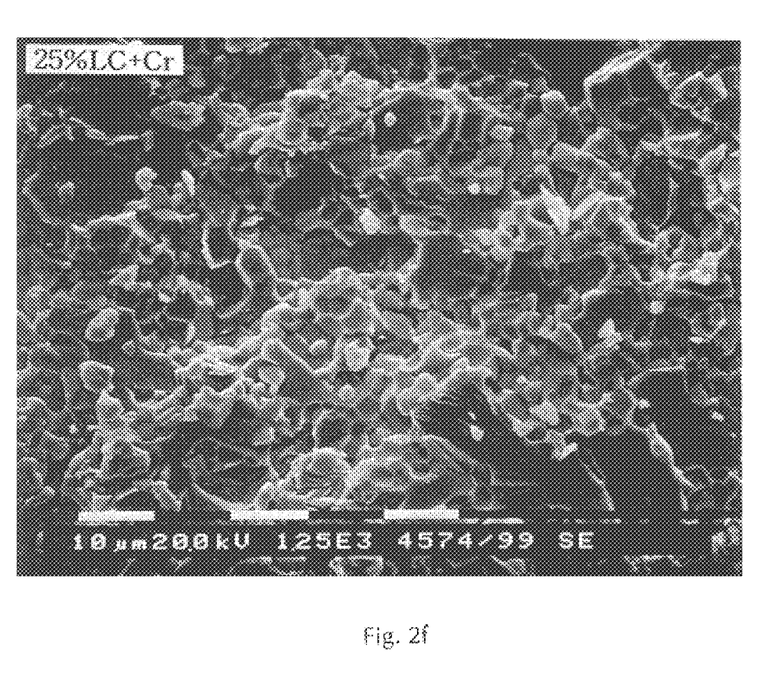

With reference to FIG. 1, there is a flow chart to illustrate a process of preparing the interconnection material for solid oxide fuel cells, according to the present invention.

As shown in this process flow, first, $La_2O_3$ and $Cr_2O_3$, after being weighed at a predetermined ratio, are sufficiently mixed, together with a solvent and a binder, by milling in a mill jar, followed by conducting calcination and pulverization to obtain an $LaCrO_3$ powder.

Subsequently, a Cr powder is mixed with the $LaCrO_3$ powder, together with small amounts of a solvent and a binder, with the aid of a ball mill. Then, the mixture thus obtained is molded into a certain shape, dried, and sintered at 1,500° C. for about 10 hours in an electric furnace to produce an $LaCrO_3$-dispersed Cr alloy useful as an interconnection material for solid oxide fuel cells.

A better understanding of the present invention may be obtained in light of the following examples which are set forth to illustrate, but are not to be construed to limit the present invention.

EXAMPLES I TO V AND COMPARATIVE EXAMPLE I

An $La_2O_3$ powder and a $Cr_2O_3$ powder were mixed in isopropyl alcohol, together with polyvinyl butyral, and milled for 48 hours in a mill jar. After being dried, the resulting mixture was calcined at 1,100° C. for 5 hours and pulverized to give an $LaCrO_3$ powder. Here, isopropyl alcohol served as a solvent while polyvinyl butyral played a role as a binder.

Thereafter, the $LaCrO_3$ powder was mixed with a Cr powder at various volume ratios within the range of the present invention in isopropyl alcohol with polyvinyl butyral and milled for 48 hours. The resulting mixtures were molded to a certain shape, after which a sintering process was conducted in an electric furnace. In the sintering process, the temperature of the molded bodies was elevated at a speed of 60° C./hr up to 1,500° C. at which they were maintained for 10 hours and then, cooled at a speed of 100° C. down to room temperature. During the temperature elevation, the organic materials contained in the mixture were completely removed. As for the sintering atmosphere, an Ar atmosphere with 5% by volume of hydrogen was used for the purpose of preventing the oxidation of the chrome metal and enhancing its sinterability during the sintering.

The compositions and properties of the samples used in Examples are given as listed in Table 1, below.

TABLE 1

| Nos. of Exmpl. | Composition (Vol %) | | Properties | | | |
|---|---|---|---|---|---|---|
| | Cr | LaCrO₃ | Theol. Density (g/cm³) | Sintered Density (g/cm³) | Relative Density (%) | Electric Conduct. (S/cm) |
| I | 95 | 5 | 7.1695 | 6.840 | 95.398 | 5.26 × 10⁴ |
| II | 90 | 10 | 7.146 | 6.931 | 96.956 | 4.28 × 10⁴ |
| III | 85 | 15 | 7.1285 | 6.939 | 97.345 | 4.13 × 10⁴ |
| IV | 80 | 20 | 7.108 | 6.944 | 97.692 | 3.69 × 10⁴ |
| V | 75 | 25 | 7.0875 | 6.86 | 96.814 | 3.13 × 10⁴ |
| C. I | 100 | 0 | 7.199 | 6.915 | 96.179 | 6.68 × 10⁴ |

The sintered densities were calculated from the weight and volume of the sintered bodies after sintering at 1,500° C. for 10 hours. The relative densities were obtained from percentages of the sintered densities to the theoretical densities. As apparent from Table 1, all the samples of Examples have a relative density of 95% or higher with no particular tendency of the relative densities according to the content of $LaCrO_3$, which indicate that the sintering behavior of the LaCrO$_3$-dispersed Cr alloys is not dependent on the content of LaCrO$_3$, but greatly depends on the sintering atmosphere and temperature. The sintering behavior of Cr is closely related to the oxygen content of the Cr. The more the oxygen there is, the poorer is the sintering, owing to the formation of oxides of Cr. In order to prevent the formation of oxides on the Cr surface during Cr sintering, an Ar atmosphere with 5% by volume of hydrogen is used in the present invention.

Regarding the electric conductivity of the Cr alloys, it is decreased with the increasing in the amount of LaCrO$_3$ because LaCrO$_3$ is of even lower electric conductivity than is Cr metal. Hence, the content of LaCrO$_3$ in the alloy is restricted within 25% by volume to satisfy the electric conductivity standard required for the interconnection materials for solid oxide fuel cells.

With reference to FIG. 2, there are SEM photographs showing the microstructures of the sintered Cr alloy samples. As clearly seen in FIG. 2b for the sample (5 vol % LaCrO$_3$+Cr) obtained in Example I, large Cr metal particles exist with small LaCrO$_3$ particles at Cr grain boundaries. An examination was made on the microstructures of the Cr alloys as a function of LaCrO$_3$ content. As the LaCrO$_3$ content increased, the Cr decreased in particle size with an almost constant maintenance in the particle size of the LaCrO$_3$. This is believed to be attributed to the fact that the LaCrO$_3$ acts as an obstacle to the moving of the Cr grain boundaries as well as to the crystal rearrangement of Cr particles during the sintering process, preventing the growth of the Cr particles.

Figure 3:
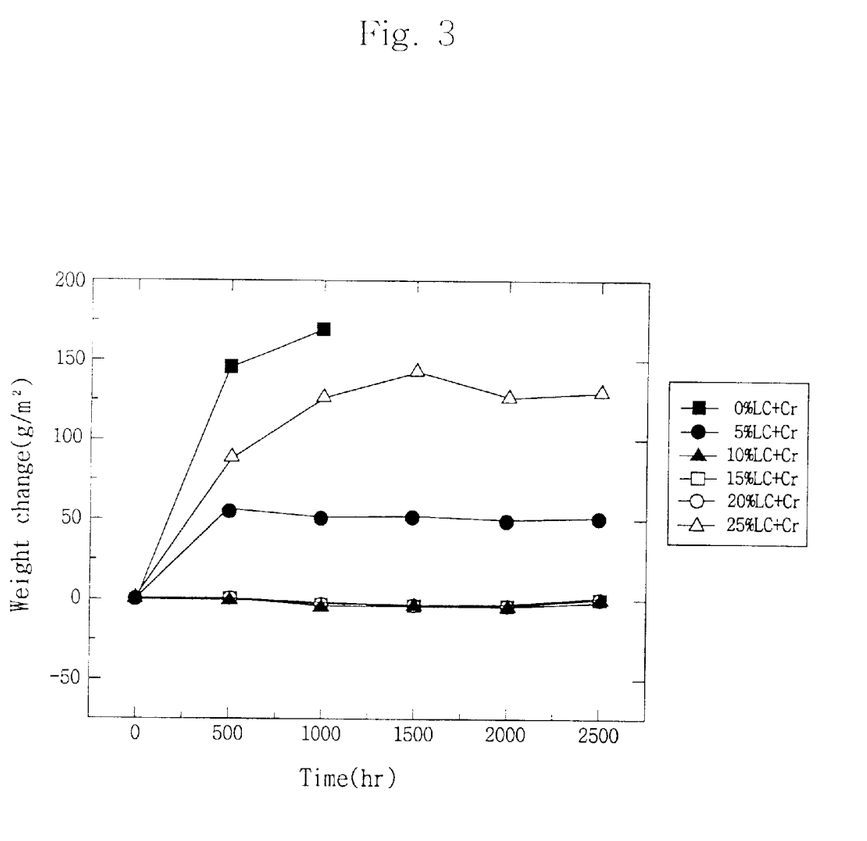
FIG. 3 is a graph showing oxidation behaviors of the $LaCrO_3$-dispersed Cr alloys as a result of an isothermal oxidation test.

With reference to FIG. 3, there are the results of an isothermal oxidation test for LaCrO$_3$-dispersed Cr alloys at 1,000° C. As seen in this figure, the weights of the Cr alloys relatively little varied with oxidation times, compared with pure Cr. In the case of pure Cr, it gained in weight with oxidation time up to 1,000 hours and then showed a great loss in weight, which was attributed to the exfoliation of the oxide scale formed on its surface. Since the oxide formed on the pure Cr was of poorer fineness and weaker in bonding to the base material than were those formed on the LaCrO$_3$-dispersed Ar alloys, the oxide which continued to become thicker with oxidation time was believed to exfoliate owing to the stress occurring in the oxide to an extent exceeding its endurable limit. On the other hand, the LaCrO$_3$-dispersed Cr alloys showed little weight change, compared with pure Cr, by virtue of the rare earth metal added. In other words, the LaCrO$_3$-dispersed Cr alloys were improved in oxidation resistance. When account is taken of oxidation resistance only, it is preferable to confine the amount of LaCrO$_3$ within a range of 10 to 20% by volume, as apparent from FIG. 3.

Figure 4:
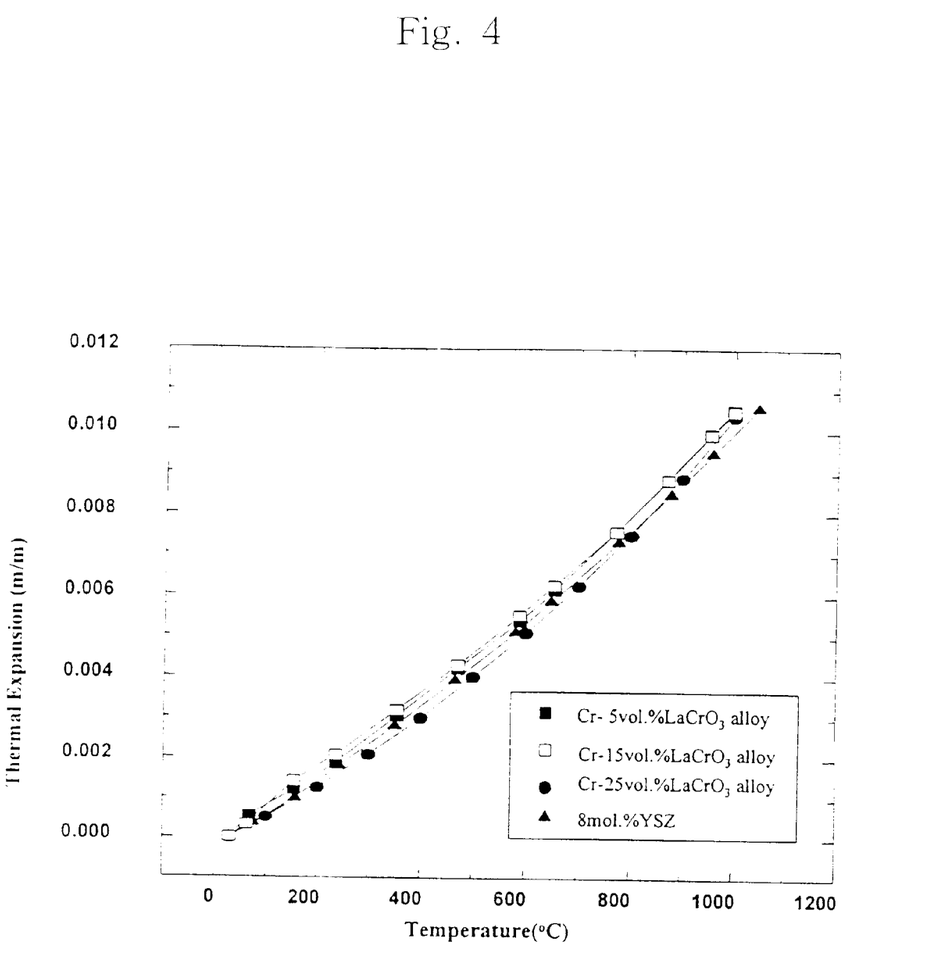
FIG. 4 is a graph showing thermal expansion behaviors of the $LaCrO_3$-dispersed Cr alloys according to the present invention.

With reference to FIG. 4, there are shown thermal expansion behaviors of a 8 mol % Y$_2$O$_3$—ZrO$_2$ (8YSZ) electrolyte plate, which is used as a solid electrolyte for solid oxide fuel cells, and LaCrO$_3$-dispersed Cr alloys. With an average coefficient of thermal expansion of approximately 10.4×10 m/m.K, as shown in the graph, 8YSZ exhibits almost the same thermal expansion behavior as those of the LaCrO$_3$-dispersed Cr alloys. Usually, in order for interconnection materials to meet a requirement of fuel cells, their coefficients of thermal expansion must fall into a range of $(10.5\pm0.5)\times10^{-6}$ m/m.K, within which the coefficients of thermal expansion of the LaCrO$_3$-dispersed Cr alloys according to the present invention exist.

As described hereinbefore, the interconnection materials for solid oxide fuel cells, according to the present invention, composed of two definite phases in which LaCrO$_3$ particles are dispersed at the grain boundaries of Cr particles, have a fine microstructure and show high electron conductivity by virtue of the growth inhibition of Cr particles during sintering. In addition, the presence of the rare earth metal, La, enables the alloys to have excellent oxidation resistance. Further, the LaCrO$_3$-dispersed Cr alloys of the present invention show a similar thermal expansion behavior to that of an electrolyte plate in terms of the coefficient of thermal expansion. Consequently, the LaCrO$_3$-dispersed Cr alloys of the present invention meet the requirements for the interconnection materials for solid oxide fuel cells.

The present invention has been described in an illustrative manner, and it is to be understood the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A metallic interconnection material for solid oxide fuel cells, composed of two fine microstructural phases in which 5–25% by volume of LaCrO$_3$ is dispersed at the grain boundaries of Cr particles.

2. A metallic interconnection material as set forth in claim 1, wherein the LaCrO$_3$ is dispersed at an amount of 10 to 20% by volume.

3. A method for preparing a metallic interconnection material for solid oxide fuel cells, comprising the steps of:

mixing 75–95% by volume of a Cr powder and 5–25% by volume of an LaCrO$_3$ powder, together with a solvent and a binder, in a mill;

molding the mixture into a predetermined shape after drying; and sintering the molded shape at approximately 1,500° C. for 10 hours to give an LaCrO$_3$-dispersed Cr alloy.

4. A method as set forth in claim 3, wherein the sintering step is carried out in an Ar atmosphere with 5% by volume of H$_2$.

* * * * *

UNITED STATES PATENT AND TRADEMARK OFFICE
CERTIFICATE OF CORRECTION

PATENT NO. : 6,150,048  
DATED : November 21, 2000  
INVENTOR(S) : Song et al.

Page 1 of 1

It is certified that error appears in the above-identified patent and that said Letters Patent is hereby corrected as shown below:

<u>Column 6,</u>  
Line 2, delete "m/m.K" and substitute therefor -- m/m.K -- .  
Line 7, delete "m/m.K" and substitute therefor -- m/m.K -- .

<u>Column 3,</u>  
Line 31, delete "m/m.K" and substitute therefor -- m/m.K -- .

Signed and Sealed this

Thirty-first Day of July, 2001

*Attest:*

Nicholas P. Godici

*Attesting Officer*

NICHOLAS P. GODICI  
*Acting Director of the United States Patent and Trademark Office*